US012617621B2

(12) United States Patent
Piani

(10) Patent No.: US 12,617,621 B2
(45) Date of Patent: May 5, 2026

(54) DEVICE FOR REPLACING A PALLET

(71) Applicant: TOPPY S.R.L., Valsamoggia (IT)

(72) Inventor: Daniele Piani, Monte San Pietro (IT)

(73) Assignee: TOPPY S.R.L., Valsamoggia (IT)

( * ) Notice: Subject to any disclaimer, the term of this patent is extended or adjusted under 35 U.S.C. 154(b) by 436 days.

(21) Appl. No.: 18/554,755

(22) PCT Filed: Mar. 29, 2022

(86) PCT No.: PCT/EP2022/058252
§ 371 (c)(1),
(2) Date: Oct. 10, 2023

(87) PCT Pub. No.: WO2022/218687
PCT Pub. Date: Oct. 20, 2022

(65) Prior Publication Data
US 2024/0190659 A1 Jun. 13, 2024

(30) Foreign Application Priority Data

Apr. 16, 2021 (IT) ........................ 102021000009698

(51) Int. Cl.
B65G 7/08 (2006.01)
B65G 1/02 (2006.01)

(52) U.S. Cl.
CPC .............. B65G 7/08 (2013.01); B65G 1/023 (2013.01); B65G 1/026 (2013.01); Y10S 414/106 (2013.01); Y10S 414/108 (2013.01)

(58) Field of Classification Search
CPC .......... B65G 7/08; B65G 1/023; B65G 1/026; B65G 2201/0267; B65G 65/23;
(Continued)

(56) References Cited

U.S. PATENT DOCUMENTS

| | | | |
|---|---|---|---|
| 3,946,880 A | 3/1976 | Schmitt | |
| 6,375,407 B1 | 4/2002 | Coblentz | |

FOREIGN PATENT DOCUMENTS

| | | |
|---|---|---|
| EP | 2508449 A1 | 10/2012 |
| NL | 1008203 C | 8/1999 |

OTHER PUBLICATIONS

Bibliographic data including English Abstract, DEPATISnet, Application No. NL 000001008203C, 2 pages.
(Continued)

*Primary Examiner* — Gregory W Adams
(74) *Attorney, Agent, or Firm* — Francis J. Maguire; WARE FRESSOLA MAGUIRE & BARBER LLP

(57) ABSTRACT

A device for replacing a first pallet (P) supporting a load (C) with a second pallet (S) includes a flat faced slide surface element (3), a flat faced translating support element (5), a load sliding control element (7) parallel to the translating support element (5), a connecting element (9), where the load sliding control element is connected to the slide surface element (3) and/or to the connecting element (9), and a rotation member (11) connected to the connecting element (9) to allow the rotation thereof around a rotation axis (R) parallel to the flat face of the translating support element (5) between an initial condition, in which the slide surface element (3) and the translating support element (5) are respectively vertical and horizontal, and a rotated condition in which they (3, 5) are rotated by more than 90° for replacing the first pallet (P) with the second pallet (S).

15 Claims, 22 Drawing Sheets

(58) Field of Classification Search
CPC ........ B65G 61/00; B65G 57/303; B65G 1/14;
B65G 1/0407; Y10S 414/106; Y10S
414/108; Y10S 414/107; B23Q 16/08;
B23Q 16/083; B23Q 7/1431; B66F 9/12
USPC ................................ 414/927, 928, 929, 799
See application file for complete search history.

(56) References Cited

OTHER PUBLICATIONS

International Search Report (ISR) for Application No. PCT/EP2022/
058252, mailed Aug. 12, 2022, 4 pages.
Written Opinion of the International Searchin Authority (ISA/EP),
Application No. PCT/EP2022/058252, mailed Aug. 12, 2022, 6
pages.

17

5

S

7

P

C

9

3

13

1

DEVICE FOR REPLACING A PALLET

TECHNICAL FIELD

The present invention relates to the technical field concerning logistics and tools for the storage and transport of goods and in particular it refers to a device for replacing a pallet at the base of a load with a replacement pallet.

PRIOR ART

There are known devices fit for replacing a first pallet which supports a load, for example consisting of packaged goods, with a second and different pallet which is inserted under the load in place of the first pallet.

Such known devices, which provide different levels of automation and different fields of application, are generally complex, relatively bulky and expensive.

Prior art document NL 1 008 203 C2 discloses a device for replacing a pallet supporting the bottom face of a load with a second pallet replacing the first pallet; a partial disclosure of same is made by prior art document EP 2 508 449 A1.

DISCLOSURE OF THE INVENTION

An object of the present invention is to propose a relatively simple and economical device for replacing a pallet.

Another object is to propose a reliable and inexpensive maintenance device.

A further object is to propose a not bulky device.

Another object is to propose a device that can be configured according to requirements and needs.

BRIEF DESCRIPTION OF DRAWINGS

The characteristics of the invention are highlighted below with particular reference to the accompanying drawings in which.

BEST MODE TO CARRY OUT THE INVENTION

Figure 1:
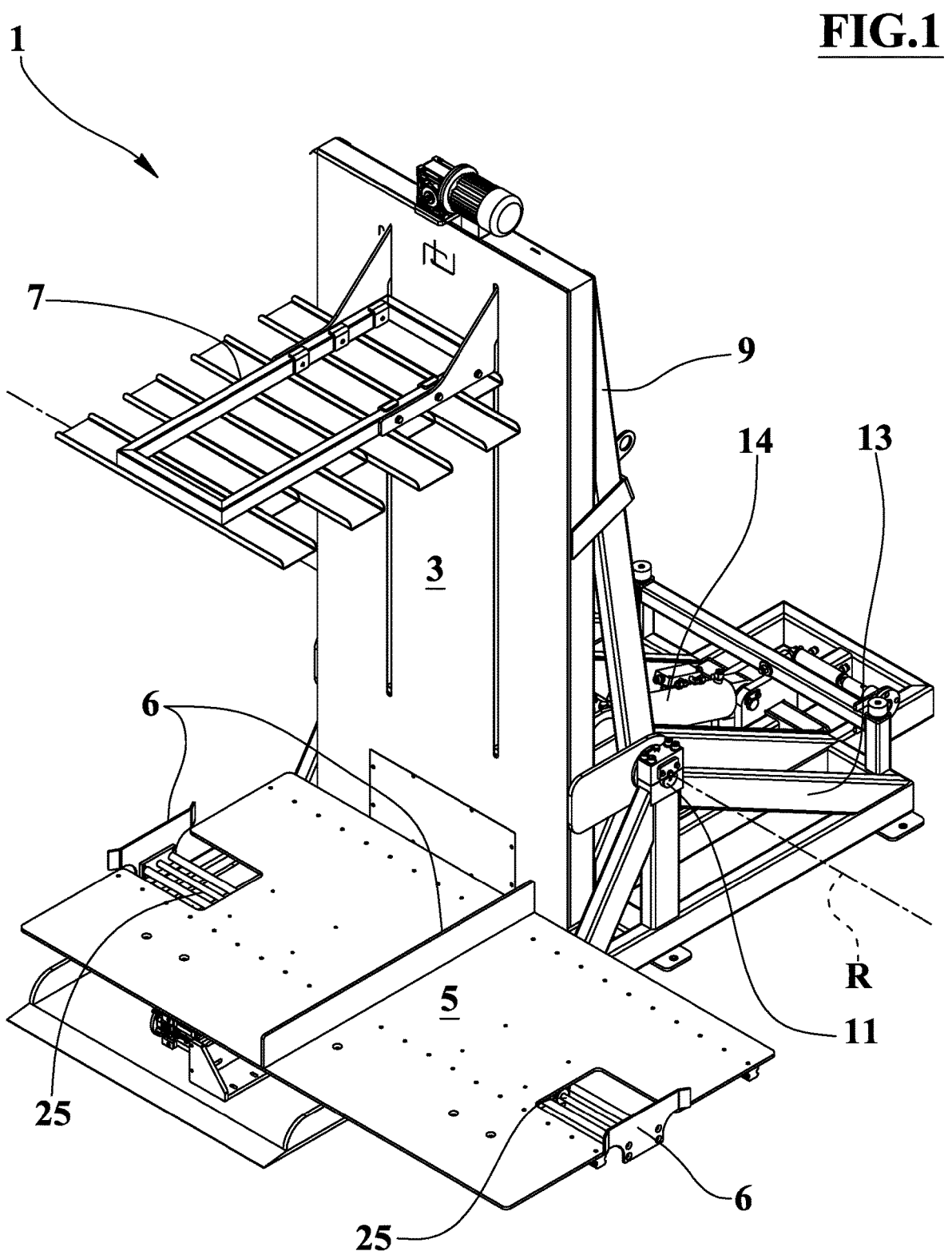
FIG. 1 illustrates an axonometric view of the device for replacing a pallet, an object of the present invention, in an operative condition of preparation.
Figure 2:
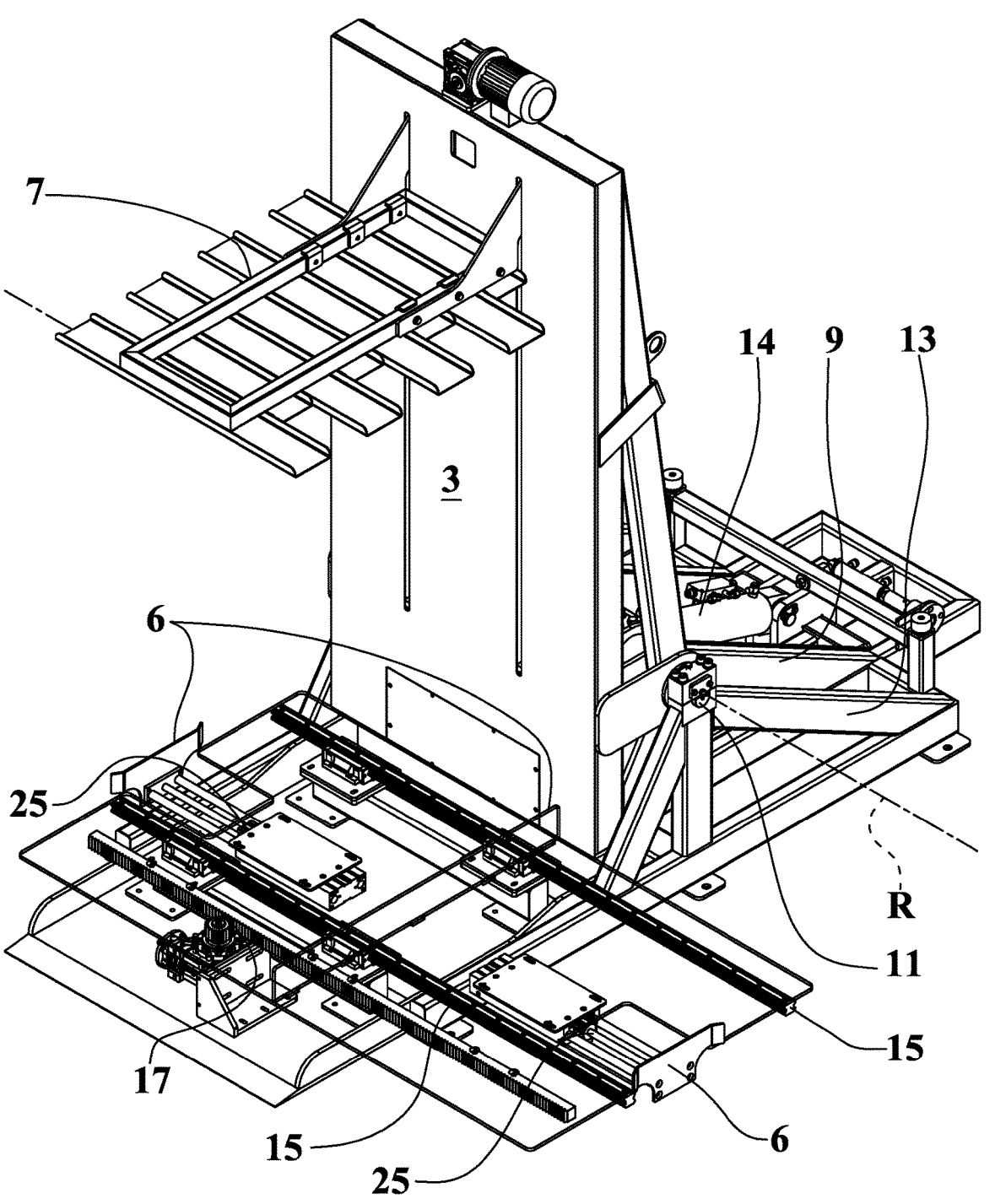
FIG. 2 illustrates an axonometric view of the device of FIG. 1 in which some parts have been removed to better highlight others.
Figure 3:
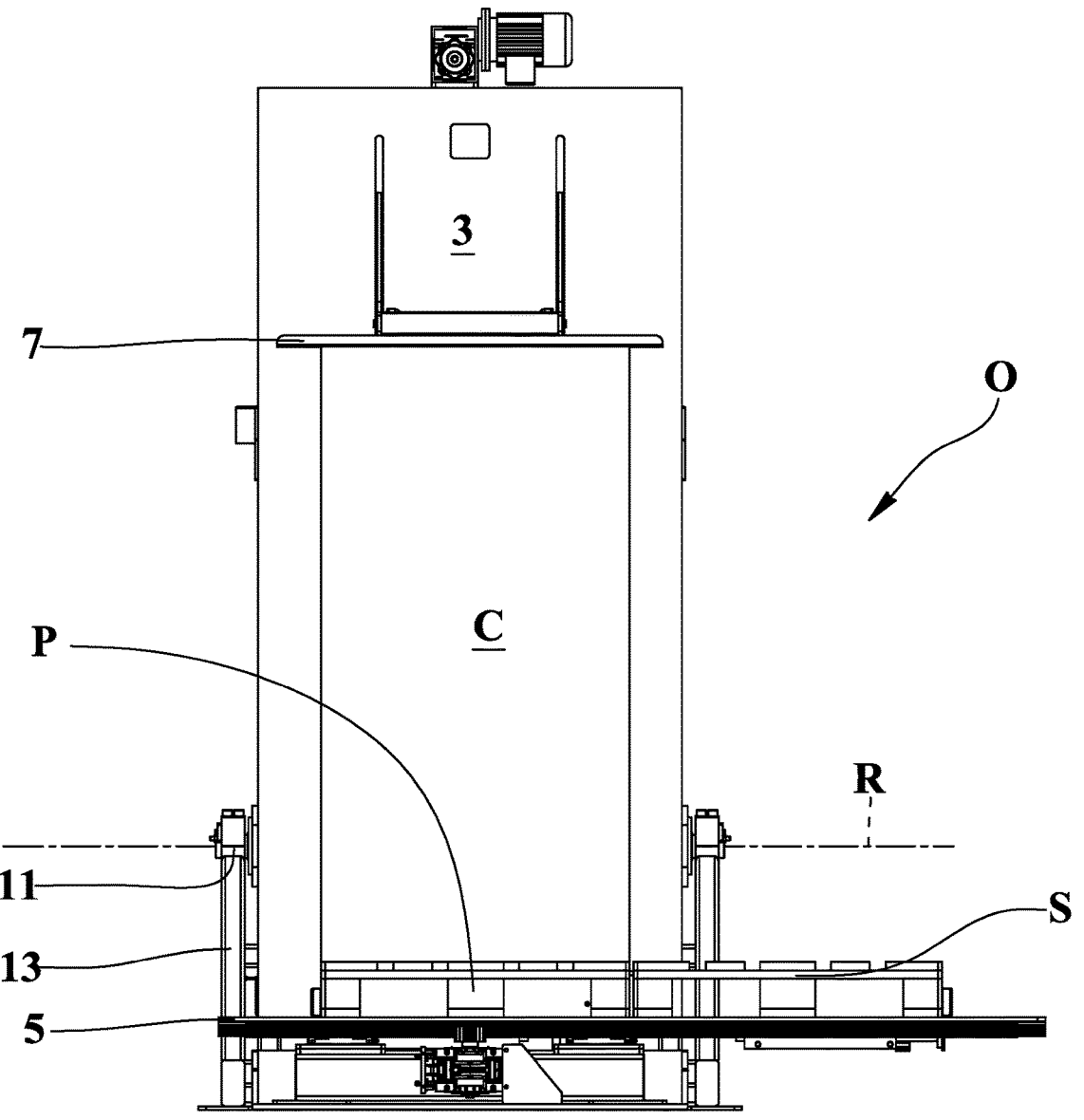
FIG. 3 illustrates a front view of the device of FIG. 1 in an initial operative condition in which a pallet supporting a load and a side-by-side replacement pallet are placed on a horizontally oriented translating support element of the device and one face of the load is facing and adjacent to a vertically oriented slide surface element of the device.
Figure 4:
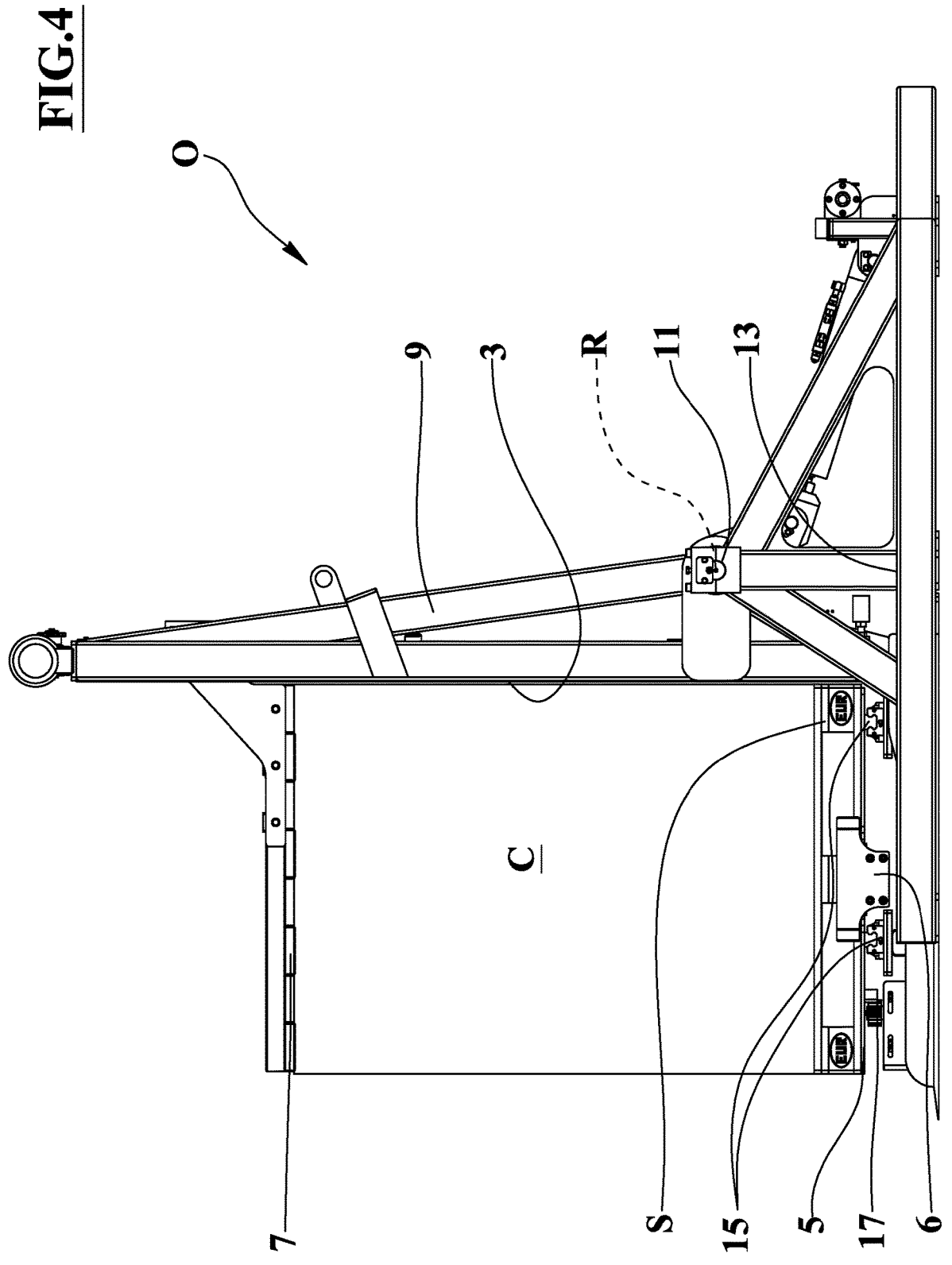
FIG. 4 illustrates a side view of FIG. 3.
Figure 5:
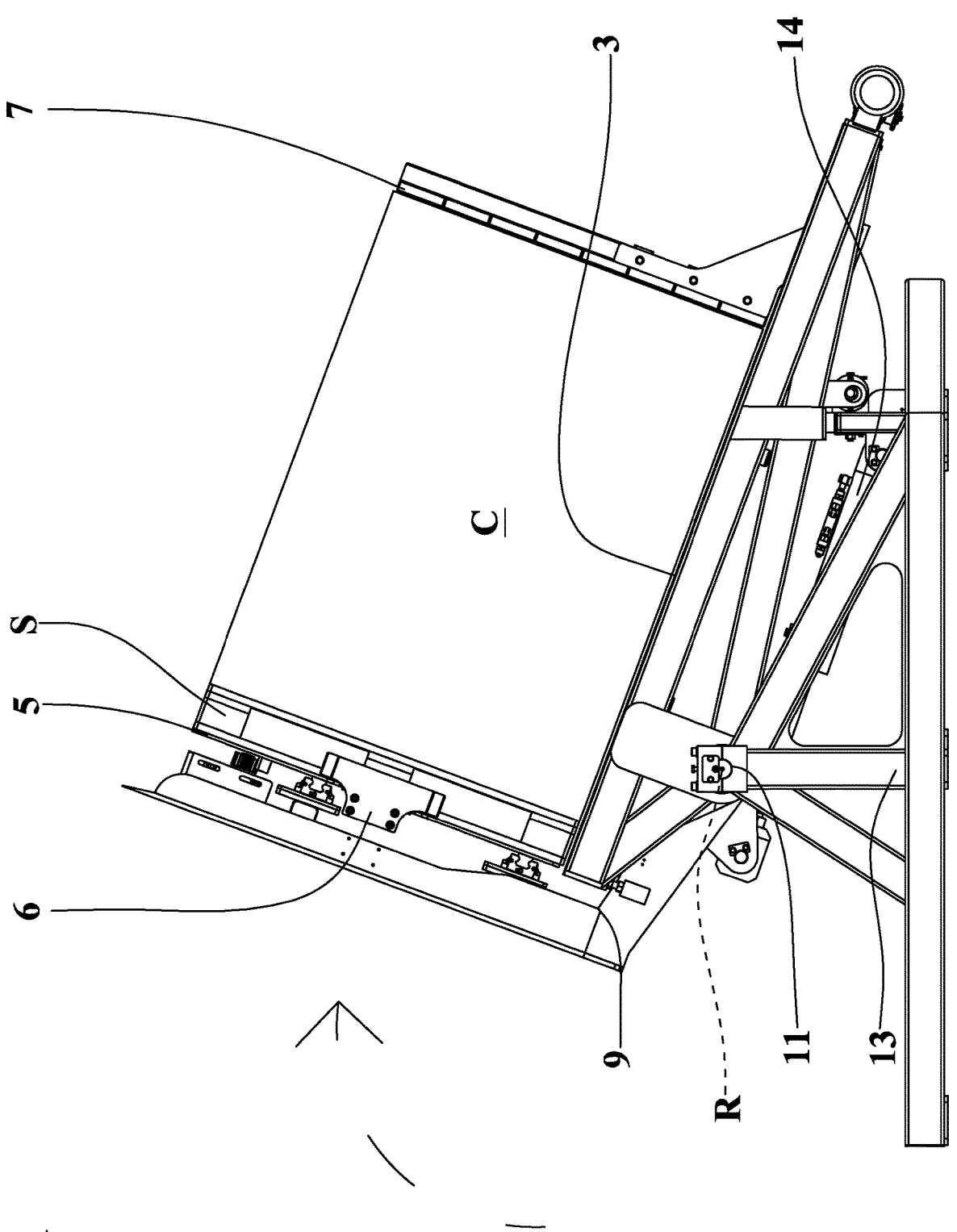
FIG. 5 and FIG. 6 illustrate side views of the device of FIG. 3 respectively in a condition of inclination and, in a condition of separation of the load from the original pallet reached following a not illustrated condition of sliding of the load.
Figure 6:
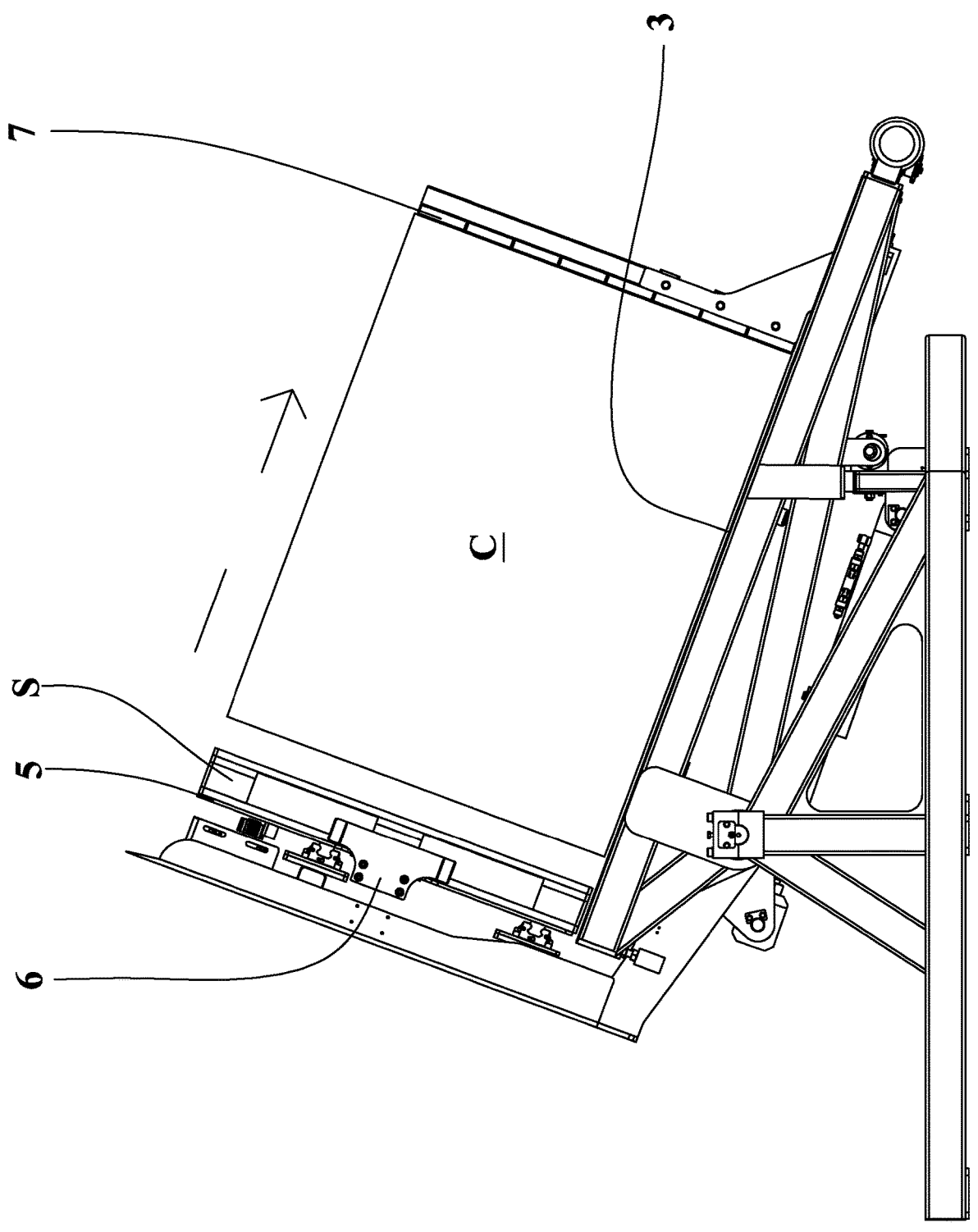
Figure 7:
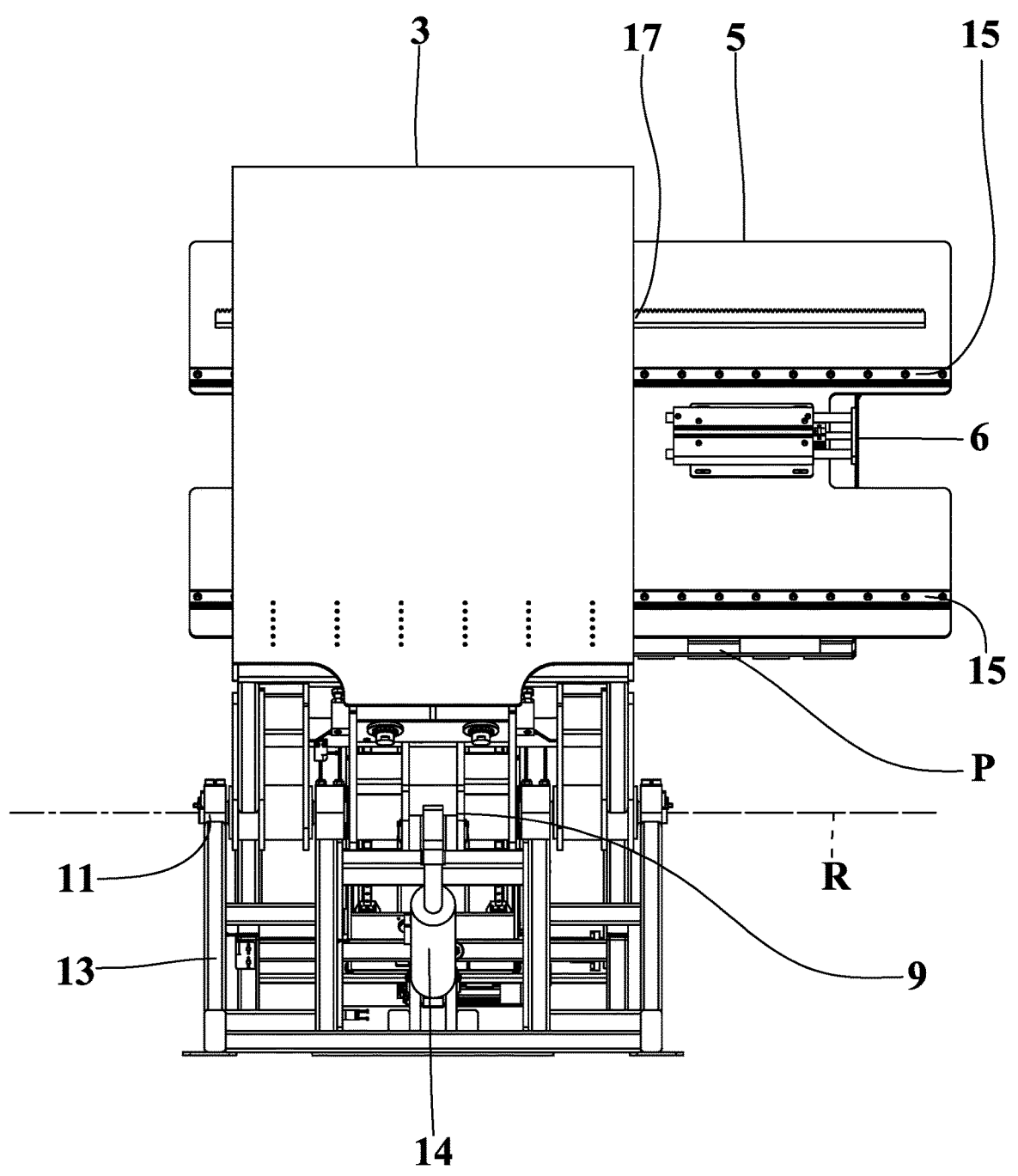
FIG. 7 illustrates a front view of the device in the condition of FIG. 5 in which some parts have been removed to better highlight others.
Figure 8:
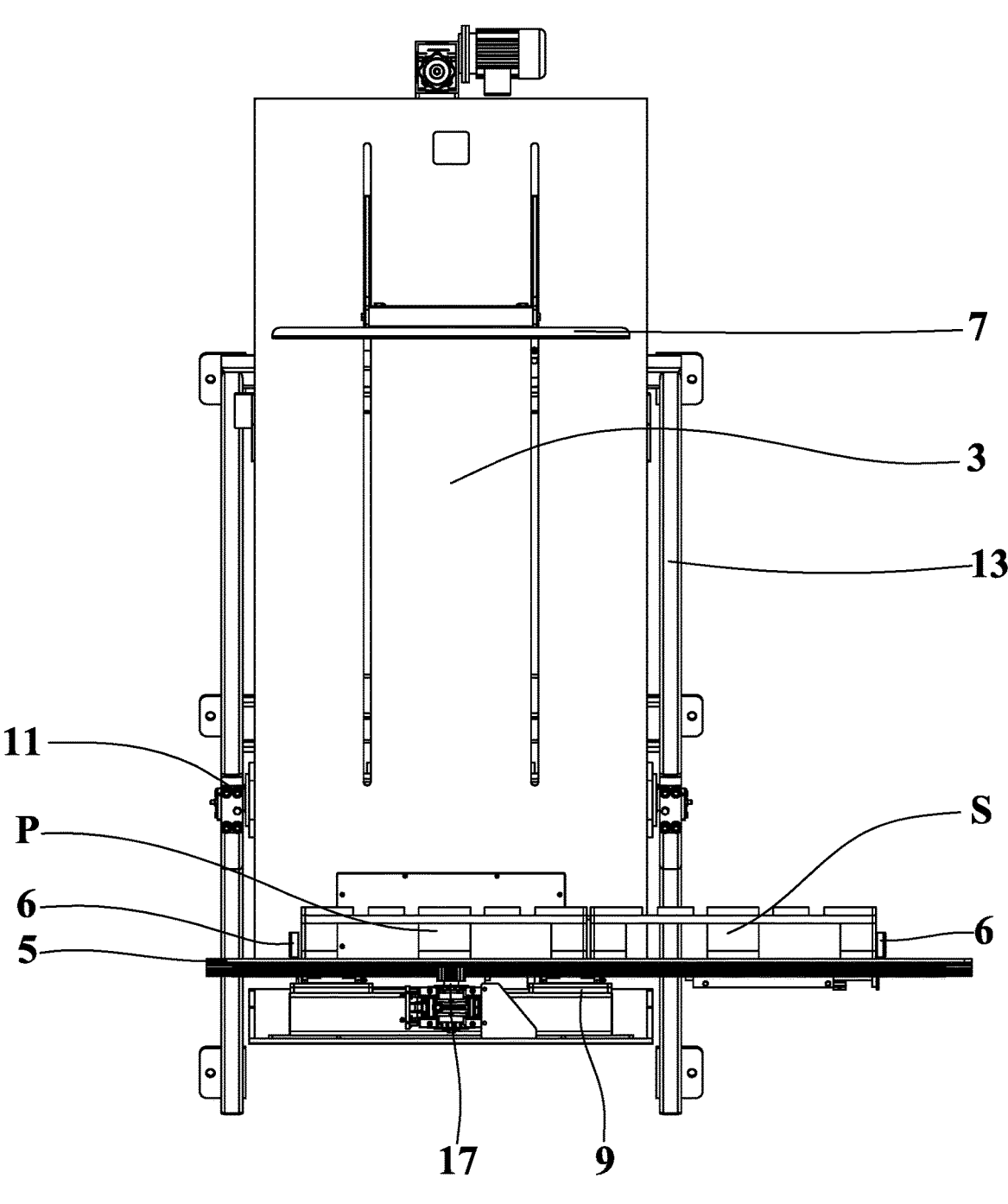
FIG. 8 illustrates the device of FIG. 3 from a point of view placed on the geometric plane of the translating support element and with a direction of view perpendicular to the slide surface element and in which the load is not illustrated.
Figure 9:
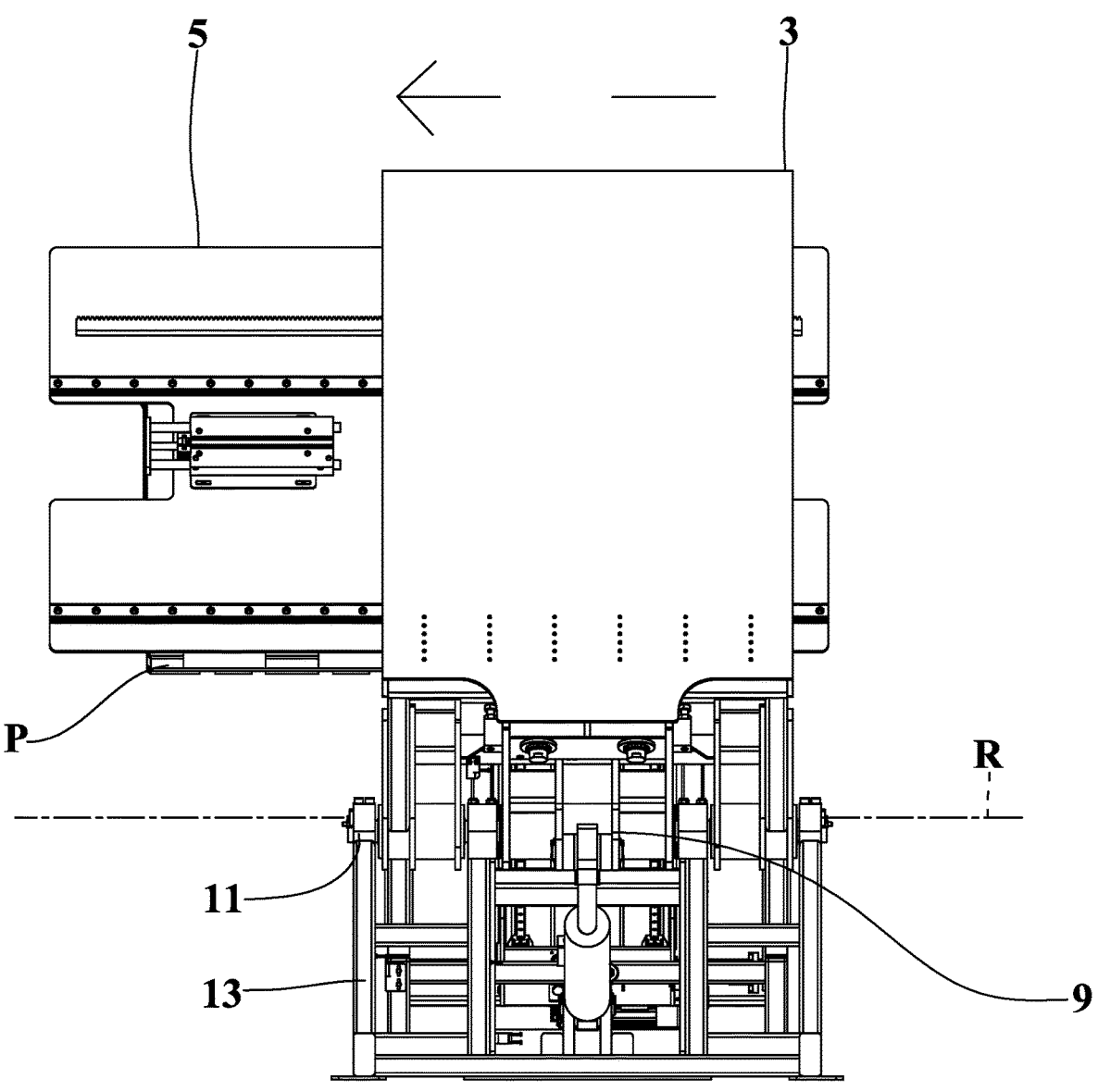
FIG. 9 illustrates the device of FIG. 7, in which some parts have been removed to better highlight others, where the translation of the translating support element has removed the original pallet and has brought the replacement pallet in front of the bottom of the load.
Figure 10:
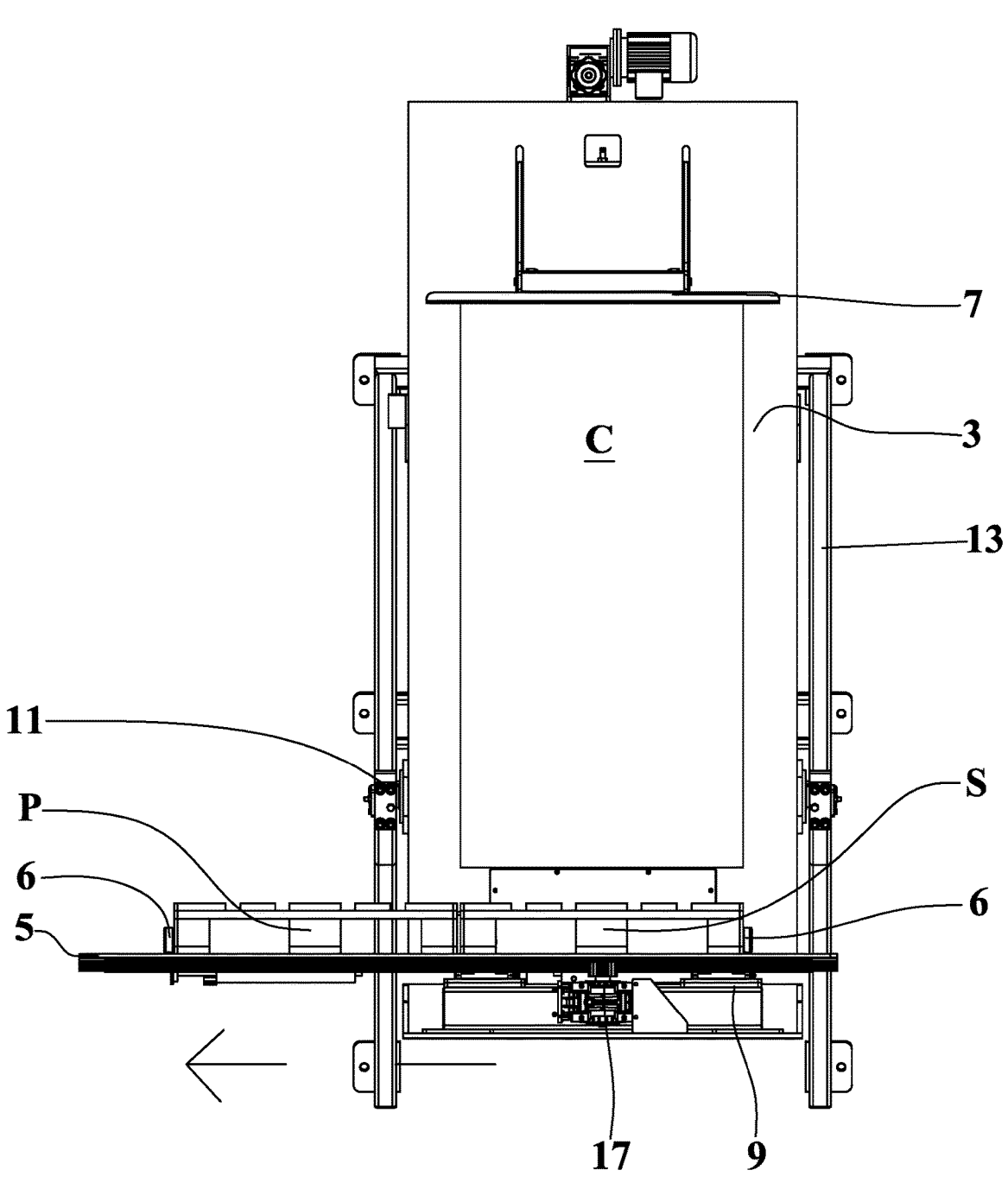
FIG. 10 illustrates the device of FIG. 9 from the same point of view adopted in FIG. 8.
Figure 11:
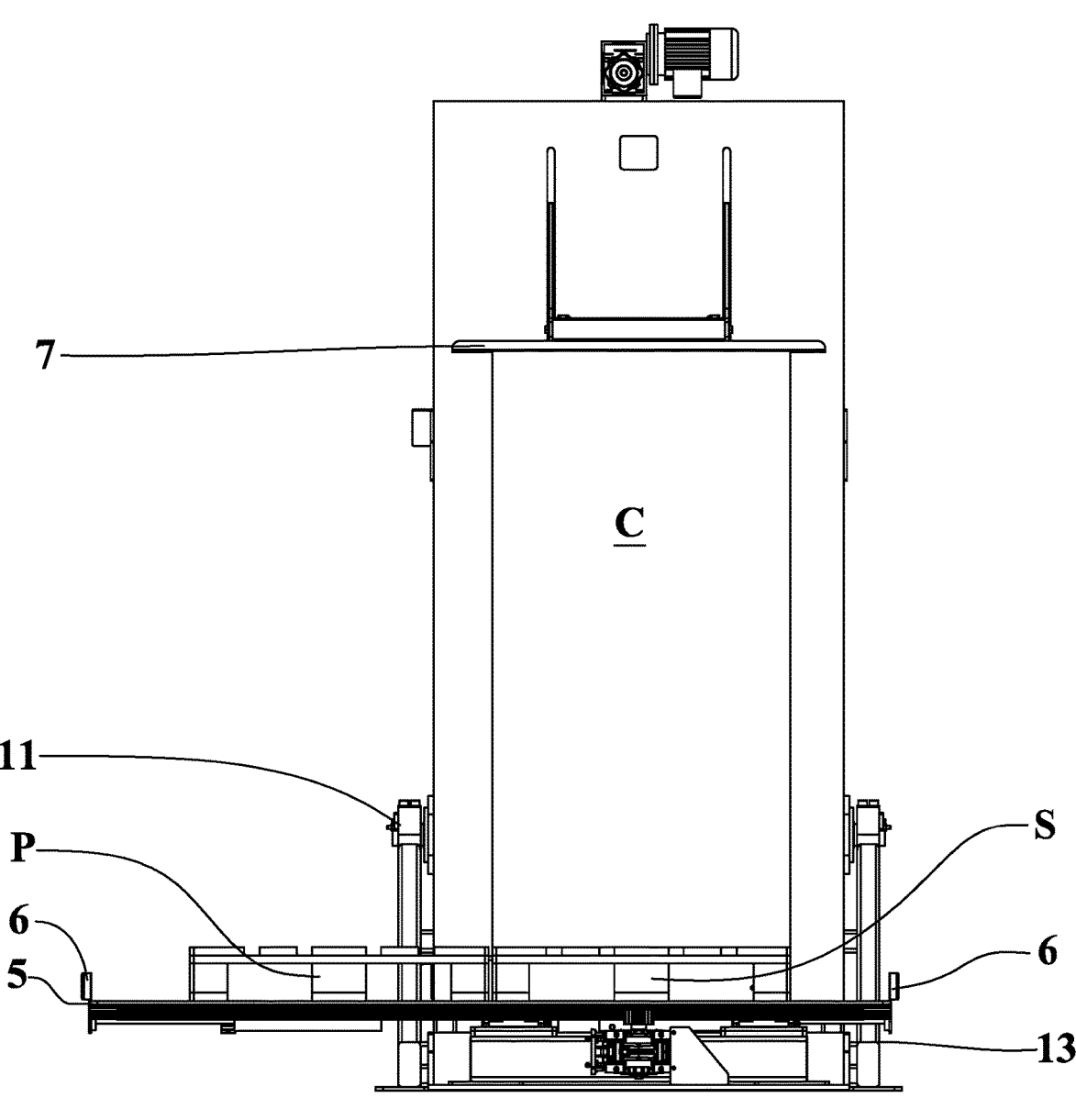
FIG. 11 illustrates the device of FIG. 10 in which a control element of the load sliding of the device, parallel to the translating support element and movable along the slide surface element, places the bottom of the load against the new replacement pallet for the one initially placed to support the load.
Figure 12:
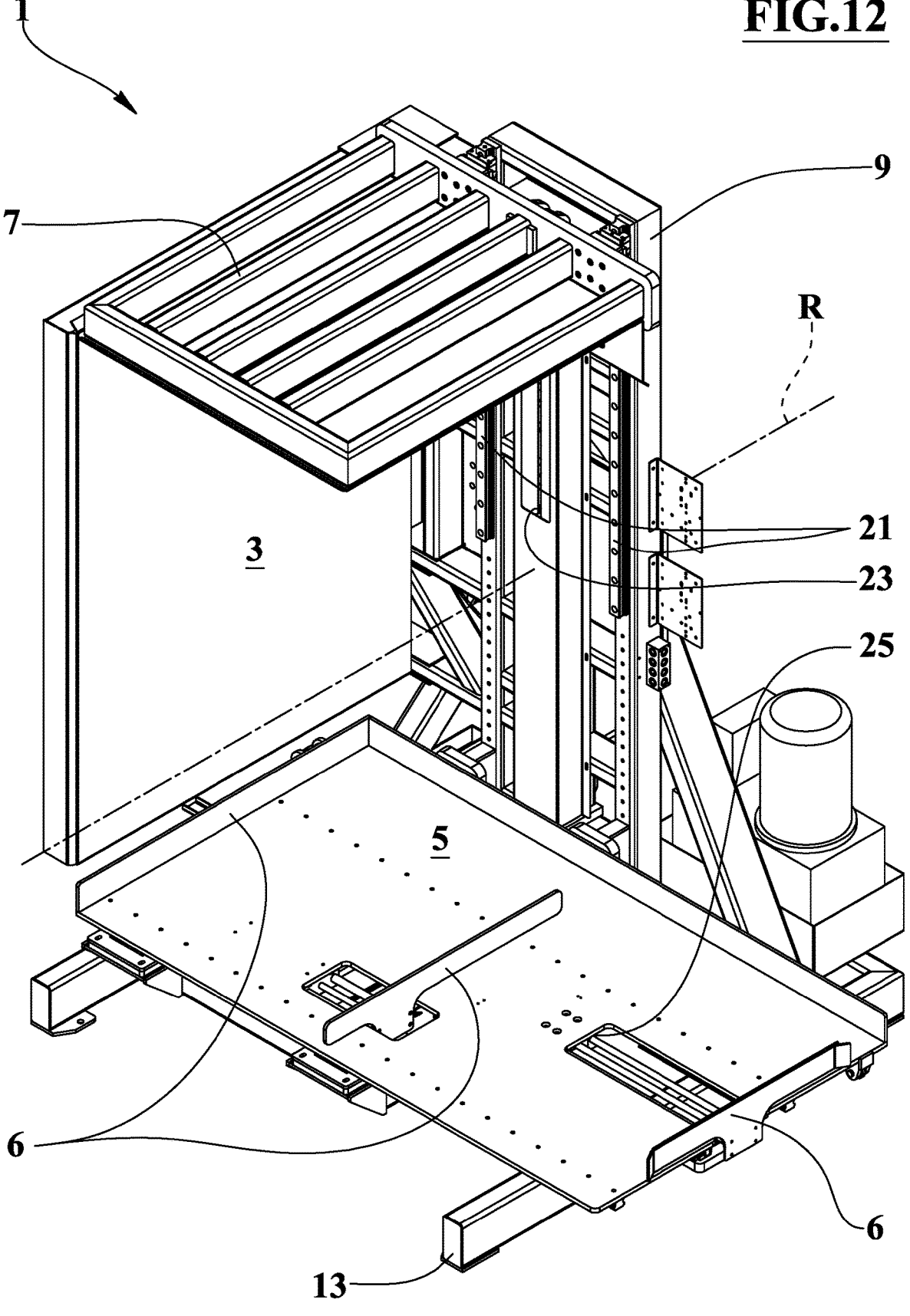
FIG. 12 illustrates an axonometric view of a variant of the device for replacing a pallet of FIG. 1 in the same operative condition of preparation of said FIG. 1.
Figure 13:
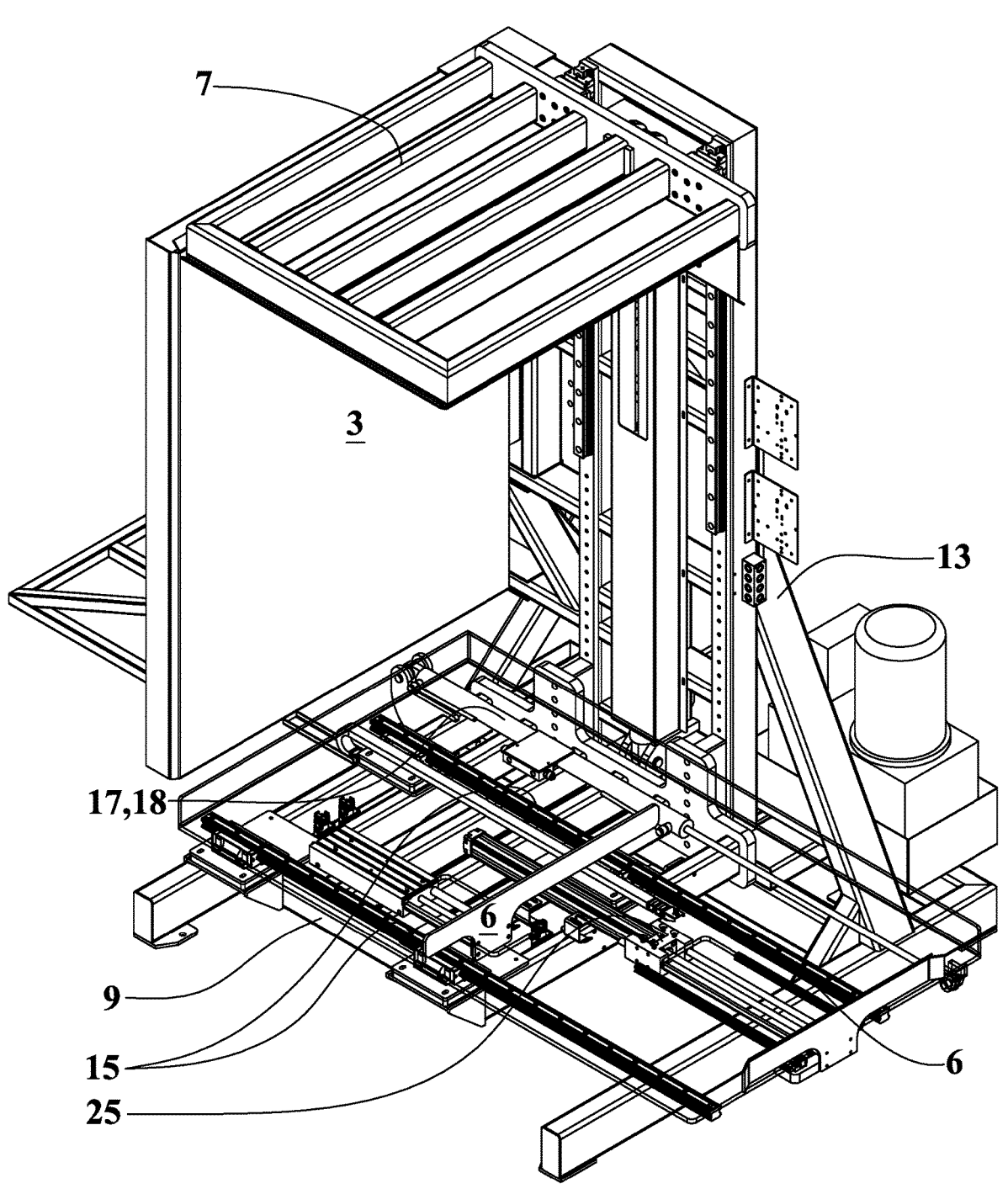
FIG. 13 illustrates an axonometric view of the device of FIG. 12 in which some parts have been removed to better highlight others.
Figure 14:
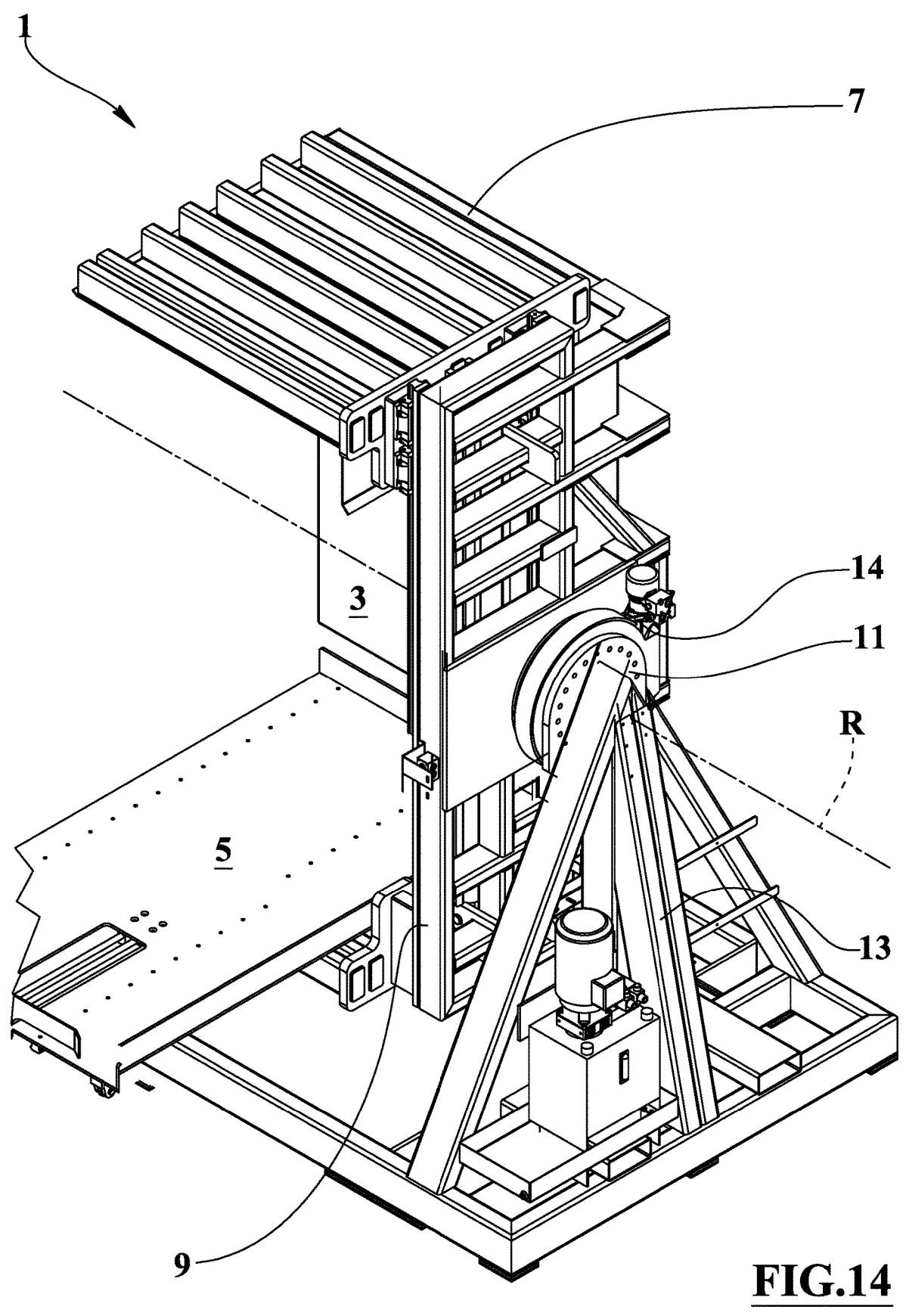
FIG. 14 illustrates a rear axonometric view of the device of FIG. 12.
Figure 15:
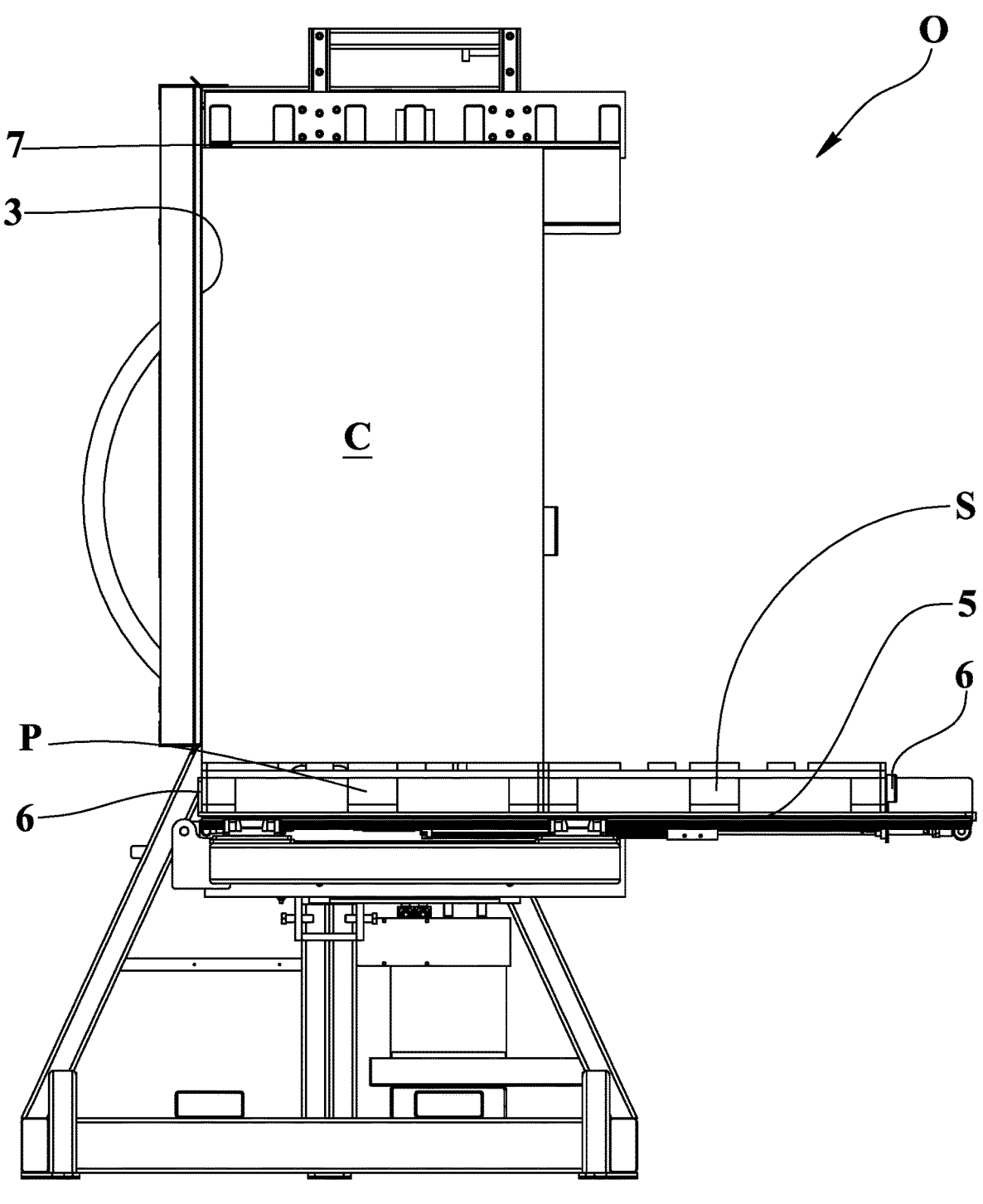
FIG. 15 illustrates a front view of the device of FIG. 12 in the initial operative condition in which a pallet supporting a load and a side-by-side replacement pallet are placed on the horizontally oriented translating support element of the device and one face of the load is faced and adjacent to the vertically oriented slide surface element of the device.
Figure 16:
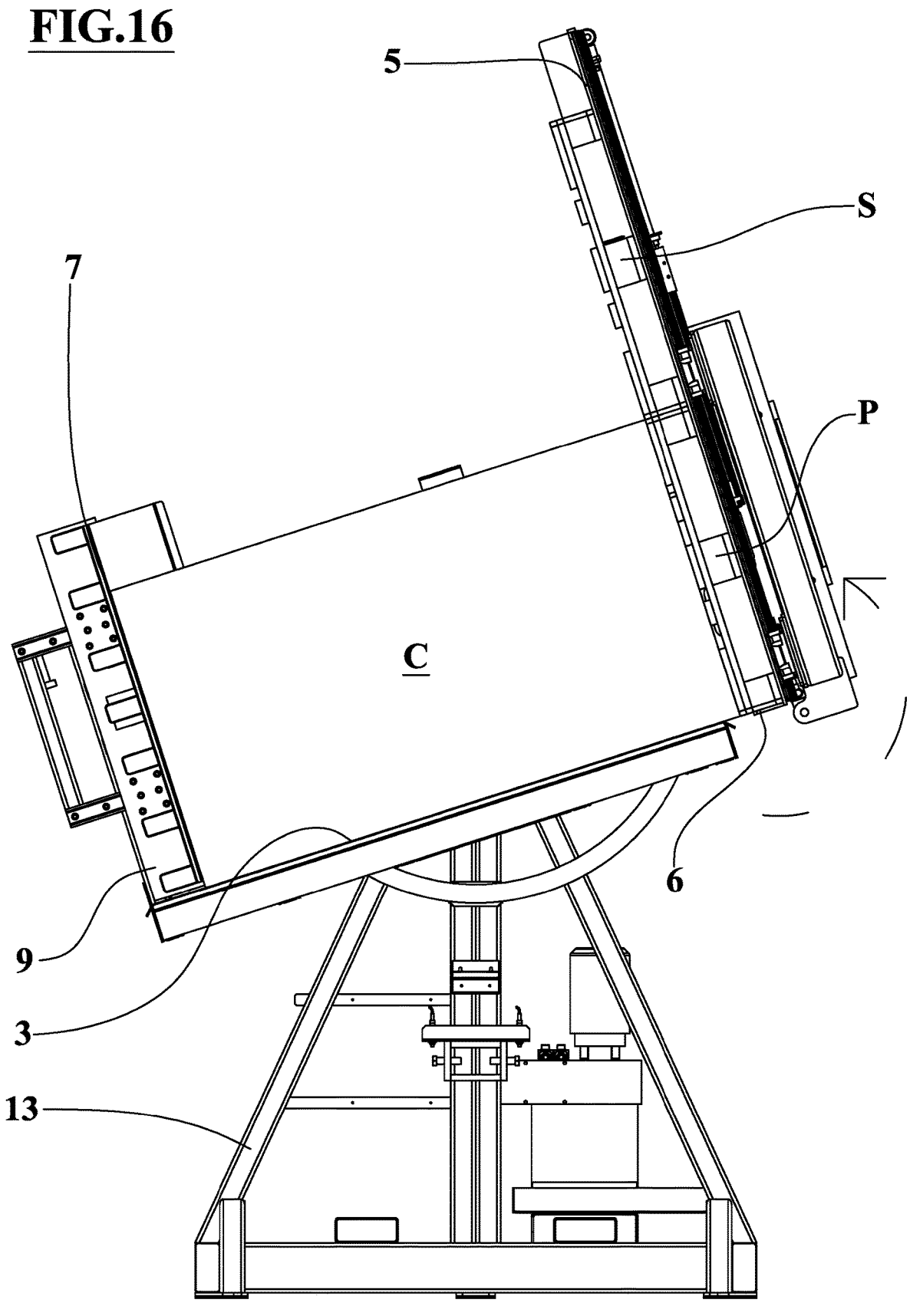
FIG. 16 and FIG. 17 illustrate views of the device of FIG. 15 respectively in the inclined condition and in the separation condition of the load from the original pallet.
Figure 17:
Figure 18:
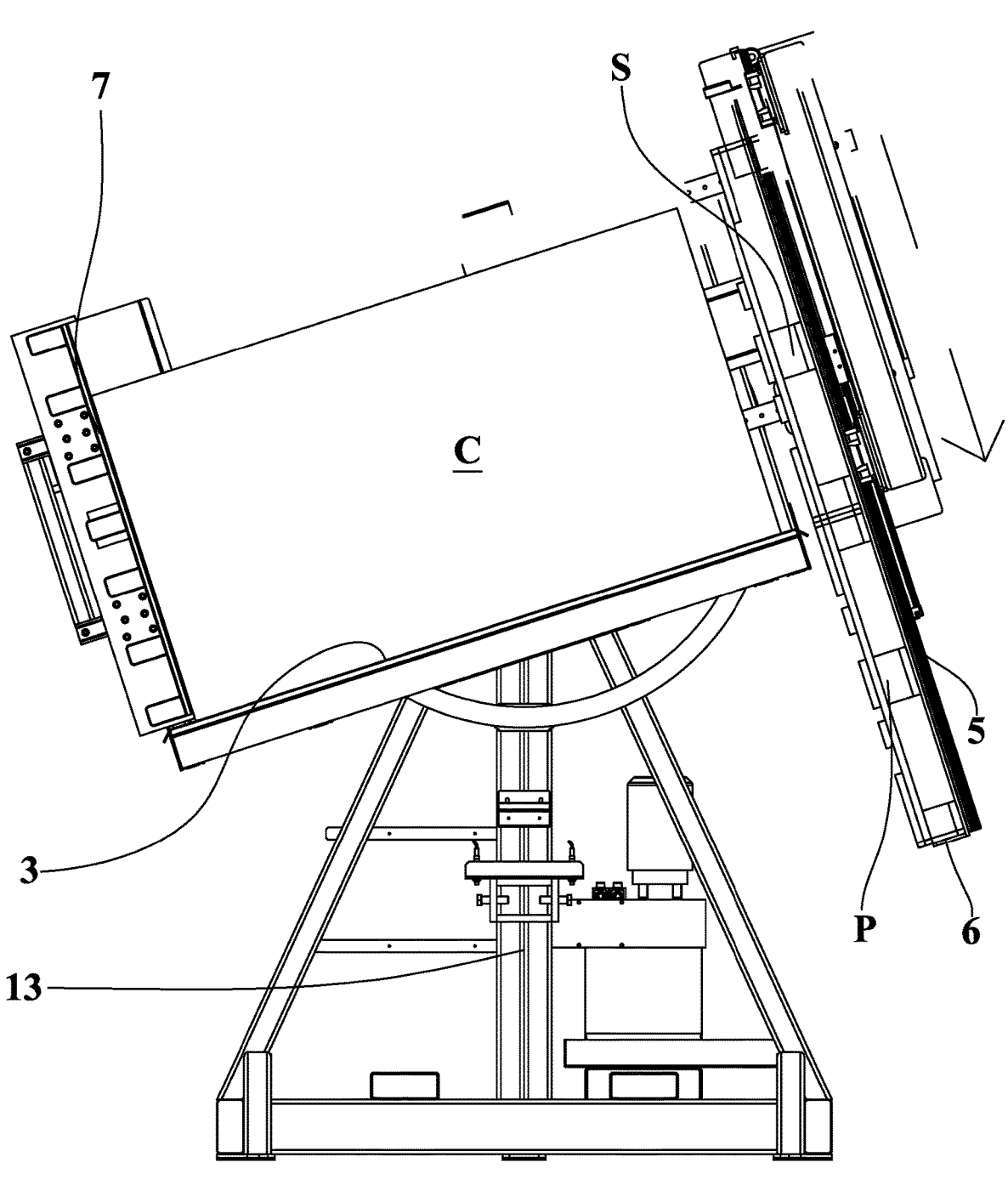
FIG. 18 illustrates the replacement of the original pallet with the replacement pallet carried out following a downward translation of the translating support element together with such pallets.
Figure 19:
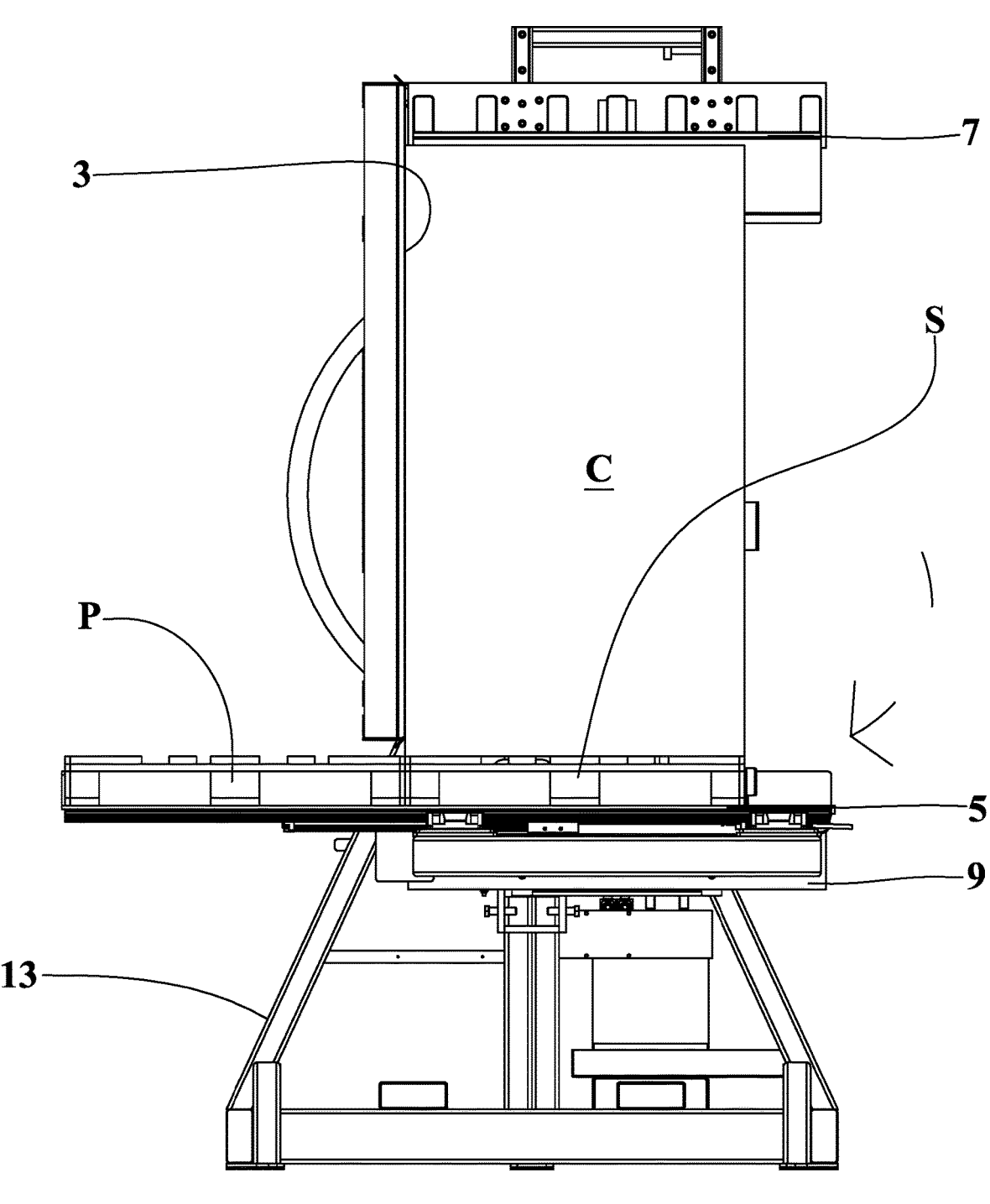
FIG. 19 illustrates the device of FIG. 15 in a condition subsequent to the replacement of the pallet and rotation in the original orientation.

With reference to FIGS. 1-11, numeral 1 indicates the device for replacing a pallet, an object of the present invention.

The pallet to be replaced, that is the first pallet P, supports the bottom face, that is the face that is normally lower than the others, of a load C, with a second pallet S replacing the first P.

The second pallet S can be identical to the first P and the replacement may be necessary for reasons of hygiene, contamination or because the first pallet is damaged or the second pallet may be of different material or size or other characteristics and must replace the first for the most varied reasons, for example of standardization, for logistical reasons, etc.

The load C can consist of a plurality of packages, for goods, stacked to form a parallelepiped and possibly tied with tape or film, or it can consist of a single large package or any object otherwise packaged in the shape of a parallelepiped.

Device 1 includes:

a slide surface element 3, for example with a rectangular-shaped plan and with a thickness between one fiftieth and one fifth of the size of the smaller side of the rectangle, having a flat face assigned for static and sliding abutment with a lateral face of the load C, where the surface of such flat face has low friction and possibly has treatments or coatings to reduce static and/or dynamic frictions;

a translating support element 5, for example with an oblong rectangle-shaped plan, defining an elongated flat face assigned to abut with the side-by-side pallets P, S, of which the first P carries the load C: where the translating support element 5 is provided with gripping elements 6 of the pallets to clamp them and hold them removably in abutment with respective areas or positioning zones of the respective elongated flat face defined by the translating support element 5 which is perpendicular to the flat face of the slide surface element 3;

a load sliding control element 7 for control of sliding of the load on the slide surface element 3, having for example a rectangular shape and equal to or larger than the plan shape of the pallet P having the largest dimensions: such load sliding control element 7 has a face parallel to and facing the area or zone of the translating support element 5 assigned to meet with the first pallet P, where such face of the load sliding control element 7 is assigned to meet with the face of the load C opposite the corresponding bottom face;

a connecting element 9, for example constituted by a set of interconnected beams or by a reticular or box-like structure having a lateral profile approximately in the shape of an "L": such connecting element 9 rigidly constrains the slide surface element 3 and constrains the translating support element 5 to translate linearly on its geometric plane in the direction of its longitudinal axis or to translate in a direction parallel to its axis and to said face of the slide surface element 3: where the load sliding control element 7 is connected to the slide surface element 3 and/or to the connecting element 9;

a rotation member 11, of the pivot or fifth wheel type, connected to the connecting element 9 to allow rotation of the latter, around a rotation axis R parallel to at least the flat face defined by the translating support element 5, between an initial condition, in which the slide surface element 3 and the translating support element 5 are respectively vertical and horizontal and one of their 3, 5 condition for replacing the pallet in which they 3, 5 are rotated by over 90°, preferably by an overturning angle comprised between about 100° and about 135°, and vice versa.

Starting from an initial operative condition O in which:

the slide surface element 3 and the translating support element 5 are respectively vertical and horizontal;

the translating support element 5 supports the first pallet P with the respective load C facing and adjacent to, or in abutment with, the slide surface element 3;

the translating support element 5 supports the second pallet S laterally to the first pallet P locking them reversibly by means of the gripping elements 6:

The rotation of the connecting element 9 allowed by the rotation member 11 leads to the partial overturning of the load and of the pallet to be replaced P and to the sliding of the load C, limited by the load sliding control element 7, up to the detachment of the first pallet P from the bottom of the load, allowing the translation of the translating support element 5 and of the second pallet S until the latter faces said bottom for abutting each other following the opposite rotation of the connecting element 9 completing the replacement.

More specifically, in the initial operative condition O when the translating support element 5 supports the first pallet P with the respective load C facing and adjacent to, or abutting against, the slide surface element 3, the face of the load opposite to the bottom one faces the corresponding face of the load sliding control element 7 and the rotation of the connecting element 9, corresponding to said overturning angle and allowed by the rotation member 11, leads to the partial overturning of the load and of the pallet P to be replaced and to the sliding by gravity of the load C, limited by the control element of the load sliding 7, along the slide surface element 3.

The first pallet P, being locked to the translating support element 5 by the gripping elements 6, does not follow the load C in its sliding and this involves its separation from the bottom of the load C.

Such separation between the first pallet P and the bottom of the load C allows the translation of the translating support element 5 which moves the first pallet P laterally and at the same time translates the second pallet S until it reaches the area or zone previously occupied by the first pallet P.

At this point, the second pallet S faces the bottom of the load but separated from it and, following the opposite rotation of the connecting element 9, a retrograde translation of the load is obtained until its bottom meets the second pallet, leading to completion the replacement.

The rectangular translating support element 5 may consist, for example and not exclusively, of a plate-like or flat box-like body with a thickness between one hundredth and one third of the size of the smaller side of the rectangle formed by such translating support element 5.

The rotation member 11 can be supported by parts of the installation environment of the device or by means not included in the device but the invention preferably, and as illustrated in the figures, provides that it comprises a base structure member 13, for example made from a set of interconnected beams or from a box-like or reticular body, and assigned to be fixed on a horizontal floor and connected to the connecting element 9 by means of the rotation member 11 so that the respective rotation axis R is horizontal and at a height with respect to the floor such as to allow that at least in the initial condition the slide surface element 3 and the translating support element 5 are respectively vertical and horizontal and to allow free rotation of the connecting element 9, and of what is fixed or connected thereto, at least up to the replacement condition of the pallet or at least until said overturning angle is reached, and vice versa.

The invention provides that the load sliding control element 7 can be locked to the slide surface element 3 at an adjustable distance from the translating support element 5 so that such distance corresponds to the total height of the first pallet with the load added to the desired mutual separation that is to be obtained for mutual separation and that all the drives, translations and rotations, or part of them, can be performed manually but preferably and as illustrated in the figures, the invention provides that the drives are carried out as described below and that the translation of the load sliding control element 7 is motorized.

The device 1 comprises linear or rotary type rotation actuators 14 interposed between the structure member 13 and the connecting element 9 for the rotation of the connecting element 9. In particular, the embodiment of FIGS. 1-11 provides that the rotation member 11 comprises two hinges with coaxial rotation pins fixed laterally to the connecting element 9 and housed in complementary rotation seats, with bearings or bushings, fixed to respective lateral supports of the structure member 13 and provides for the adoption of a single linear-type rotation actuator 14, for example with a hydraulic cylinder, having one end pivoted to the structure member 13 and the other pivoted to the rotation member 11.

Obviously, the rotation actuators 14, alternatively, can be of pneumatic electric and/or rotary type.

The translating support element 5 is connected to the connecting element 9 by means of a set of slide guides 15, with respective carriages, and at least one actuator 17, for example of the linear type with rack and motorized pinion. Such slide guides 15 and the actuator 17 are parallel to each other, to the longitudinal development of the translating support element 5, or to the respective longitudinal axis or to the respective major sides, and obviously to the direction of translation of the translating support element 5 which the slide guides 15 and the actuator 17 define.

The flat face of the slide surface element 3 is parallel to the rotation axis R. The direction of translation of the translating support element 5, or the orientation of the respective guides, is parallel to such rotation axis R and to the flat face of the slide surface element 3.

The sliding plane element 3 is adjacent to, or in abutment with, a longitudinal side of the translating support element 5.

The load sliding control element 7 consists of a flat body or a body that defines an abutment plane with the top face of the load C opposite to its bottom. Said flat body of the load sliding control element 7 is perpendicularly connected to the sliding plane element 3 and translates parallel to the translating support element 5 towards and away from it due to actuation members comprising a set of guides, with respective carriages, and at least one linear actuator mutually parallel and perpendicular to the translating support element 5 and to the load sliding control element 7.

Such load sliding control element 7 allows the load C and the first pallet P or the second pallet to be clamped against the translating support element 5 at least during part or all of the overturning rotation and the opposite rotation, avoiding displacements and perturbations of the load C: furthermore, the load sliding control element 7 guides and stops the sliding of the load C along the slide surface element 3 when the latter 3 is rotated by said overturning angle and, after the translation of the translating support element 5 and the consequent replacement of the pallet, translates the load C in a retrograde direction, bringing its bottom in contact with the second pallet S.

The gripping elements 6 of the pallets comprise a set of fins projecting transversely from the flat face of the translating support element 5 of the fixed type and/or translating longitudinally by effect of respective linear actuators 25, for example comprising guides and electric, hydraulic or pneumatic actuators.

For example, the gripping elements 6 may comprise a fixed fin blocked transversely to the central portion of the translating support element 5 and two movable fins connected to the longitudinal ends of the translating support element 5 and operated towards and away from the median fixed fin to clamp and release the first pallet P and the second pallet S.

The device also comprises programmable digital control means provided with input ports for signals and output ports for controlling the operation of the active parts of the device according to its programming and the signals received from position, presence, rotation, etc. sensors associated with elements and members of the device.

The variant of FIGS. 12-19, alternatively, provides that the flat face of the slide surface element 3 is parallel to the rotation axis R and that the translation direction of the translating support element 5 is perpendicular to such rotation axis R and to the flat face of the slide surface element 3. Such rotation axis R is determined by a single rotation member 11 of the fifth wheel type interposed between the structure member 13 and the connecting element 9 and positioned behind the slide surface element 3. Such rotation member 11 of the fifth wheel type is provided with a rotary rotation actuator 14, for example of the type provided with a toothed crown coaxial to the rotation axis R, fixed to the connecting element 9 and rotated by a motorized pinion fixed to the structure member 13.

The slide surface element 3 is adjacent to a transverse side of the translating support element 5 which can be provided with an actuator 17 or a linear damper 18, the latter assigned to control the sliding speed by gravity of the translating support element 5 itself.

The slide surface element 3 is spaced from the translating support element 5 and the corresponding gripping elements 6 for the passage of the latter 6 and first pallet P between such slide surface element 3 and the translating support element 5.

The load sliding control element 7 consists of a flat body, or which defines an abutment plane with the load C, connected to a portion of the connecting element 9 by means of a set of respective linear guides 21, with associated carriages, and at least one linear actuator 23 parallel to each other and to the slide surface element 3 and perpendicular to the axis R and to the translating support element 5 to translate such load sliding control element 7 parallel to the translating support element 5 approaching and in removal from the translating support element 5.

As seen, in the operative condition of replacement, when the connecting element 9 is rotated by said overturning angle, the translating support element 5 with the pallets P, S can translate downwards by gravity without the need for an actuator. In such case, the linear damper 18, for example of the cylinder and piston type with internal viscous fluid, also called hydraulic damper, prevents the translating support element 5 from reaching excessive speeds and from excessively stressing its stop latch and the device.

Both embodiments provide that the load C supported by the second pallet S can be picked up, preferably after a slight lifting of the load sliding control element 7, to a transpallet, by a lift or by another suitable means. Similarly, the first pallet P can be removed by a suitable lifting and transport means. Having done this, the translating support element 5 can be moved backwards, restoring the initial condition.

Figure 20:
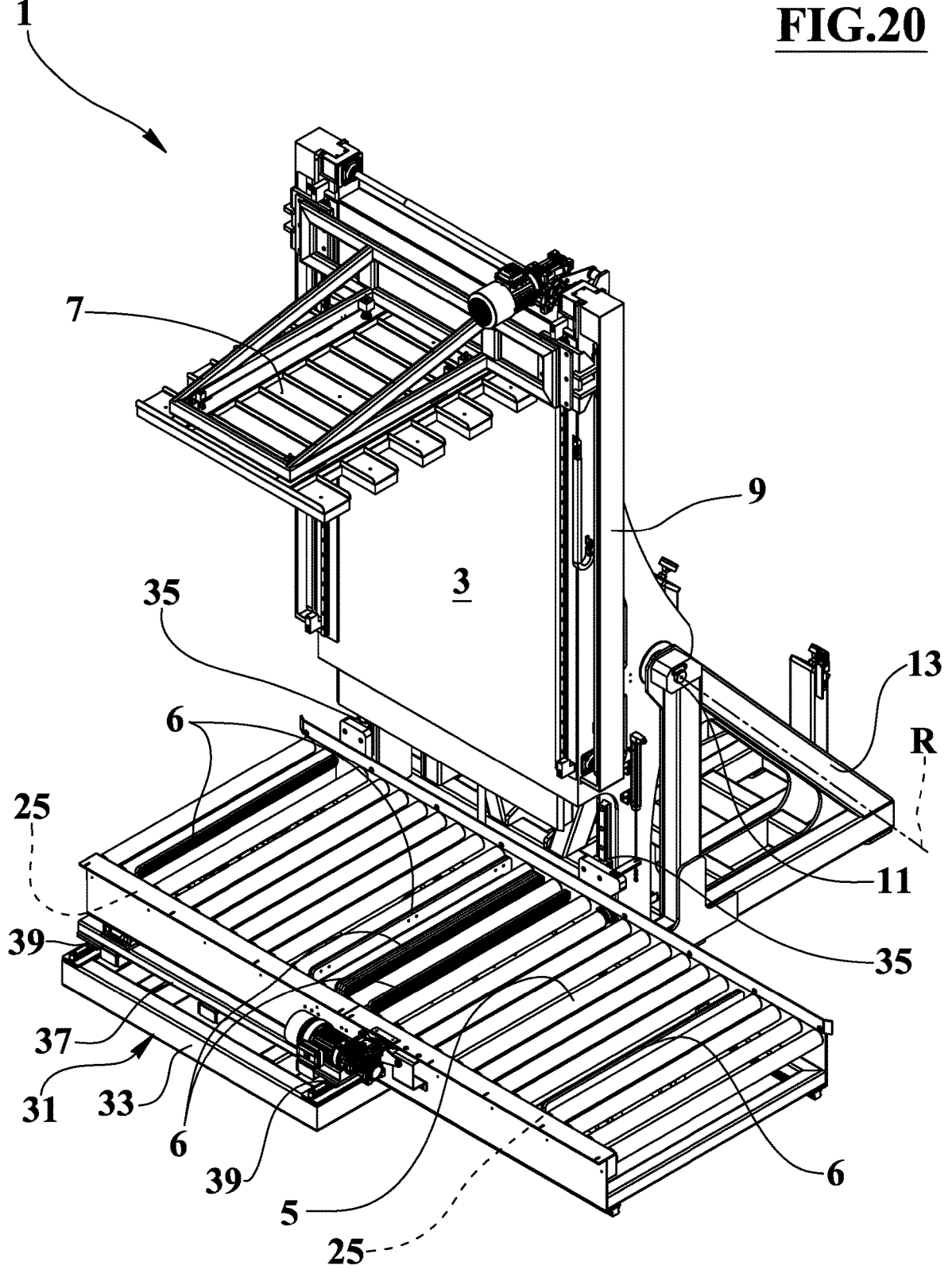
FIG. 20 and FIG. 21 illustrate axonometric views and in respective operative conditions of a further variant of the device for replacing a pallet of FIG. 1.
Figure 21:
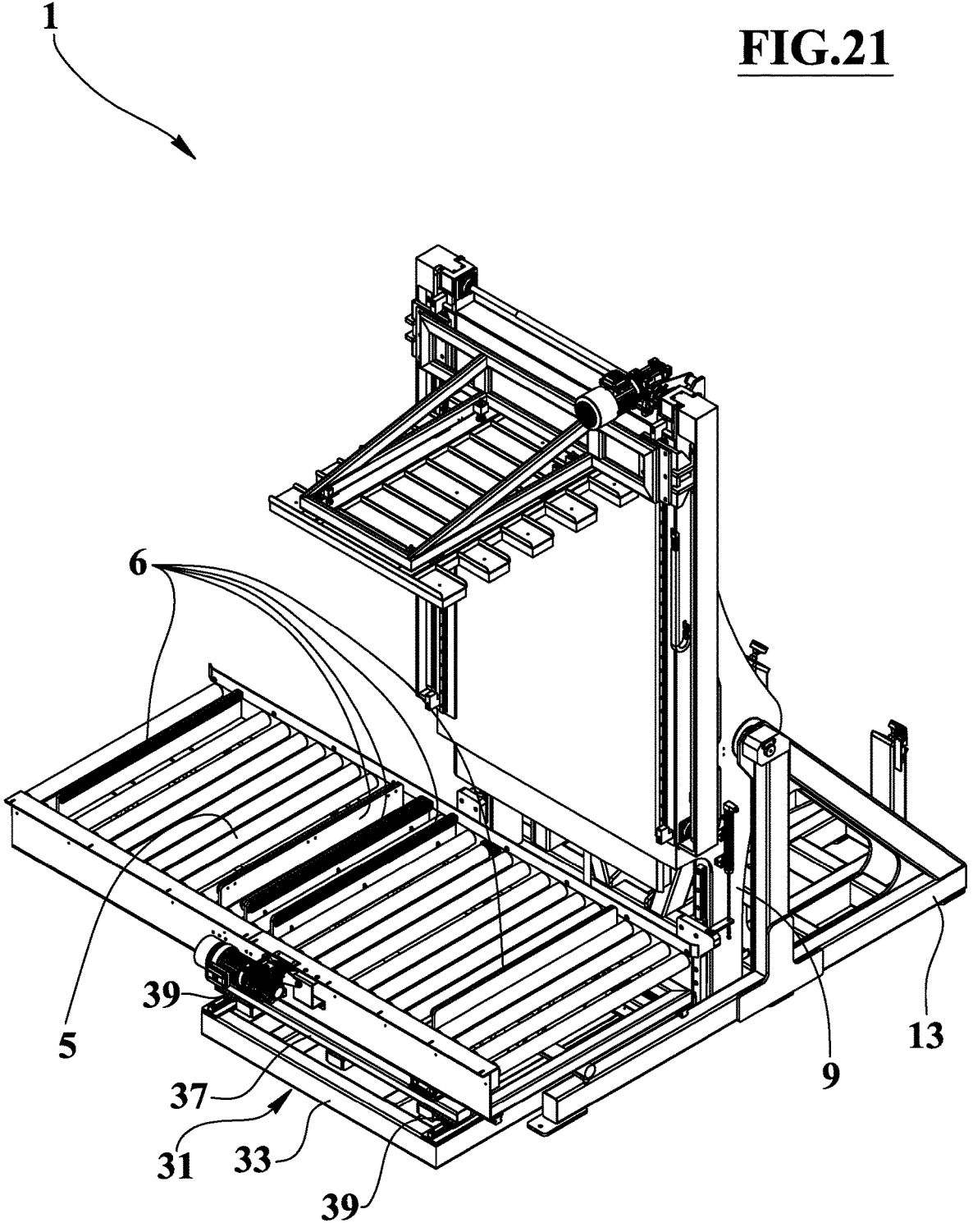

The variant of FIG. 20 and FIG. 21 differs from the other embodiment above described also because of the translating support element 5 comprises a roller conveyor defining the surface for abutting or resting the pallets. The rollers of the conveyor are free or motorized.

Each end portion of the translating support element 5, consisting of, or including, the said roller conveyor, comprises a respective gripping element 6 provided with a respective linear actuator 25 to translate the gripping elements 6 in the longitudinal direction of the surface defined by the roller conveyor and the median portion of the translating support element 5 comprises a plurality, for instance three, of gripping element 6, for instance not longitudinally translating. All the gripping elements 6, irrespective if end or median located, are provided with respective hiding actuators, each assigned to translate perpendicularly to the surface of the translating support element 5, the respective gripping element 6 from a hidden condition between rollers and a protruding condition outward the surface defined by the translating support element 5 and vice versa. Such an arrangement allows the gripping elements 6 to grip pallets of different sizes despite the limited space and stroke between two adjacent rolls.

The device 1 comprises a translating member 31 connected to the translating support element 5 by means of the set of slide guides 15 and at least one linear actuator 17 or linear damper 18: consequently, the support element 5 with the roller conveyor and at least the gripping elements 6, are supported in a longitudinal mobile way by the translating member 31.

The translating member 31 comprises at least a shelf member 33 connected to the connecting element 9 by means of a set of first motorized guides 35 to move the translating support element 5 perpendicularly to its respective surface. The translation of the translating support element 5 perpendicularly to itself, carried out by the first motorized guides 35, allows the device 1 to operate with pallets having a large span of different thickness.

The translating member 31 could optionally comprise a transversal support 37 connected to the shelf member 33 by means of a set of second motorized guides 39 to move the translating support element 5 in the transversal direction that is perpendicular to the longitudinal direction and parallel to the surface defined by translating support element 5. The structure and configuration of the translating member 31 allow the device 1 to operate with many kinds and standards of pallets and with many types, dimension and positions of loads on the pallets.

Said embodiment above described with reference to FIGS. 20 and 21 that illustrate it and comprising also the optional transversal support 37, is the preferred embodiment of the invention.

The invention further provides that also the embodiments of FIGS. 1-19 could be provided with the translating member 31 in this case supporting the at least one linear actuator 17, the set of slide guides 15, the possible linear damper 18, the translating support element and the other parts connected to the latter, as the gripping elements 6, etc.

Figure 22:
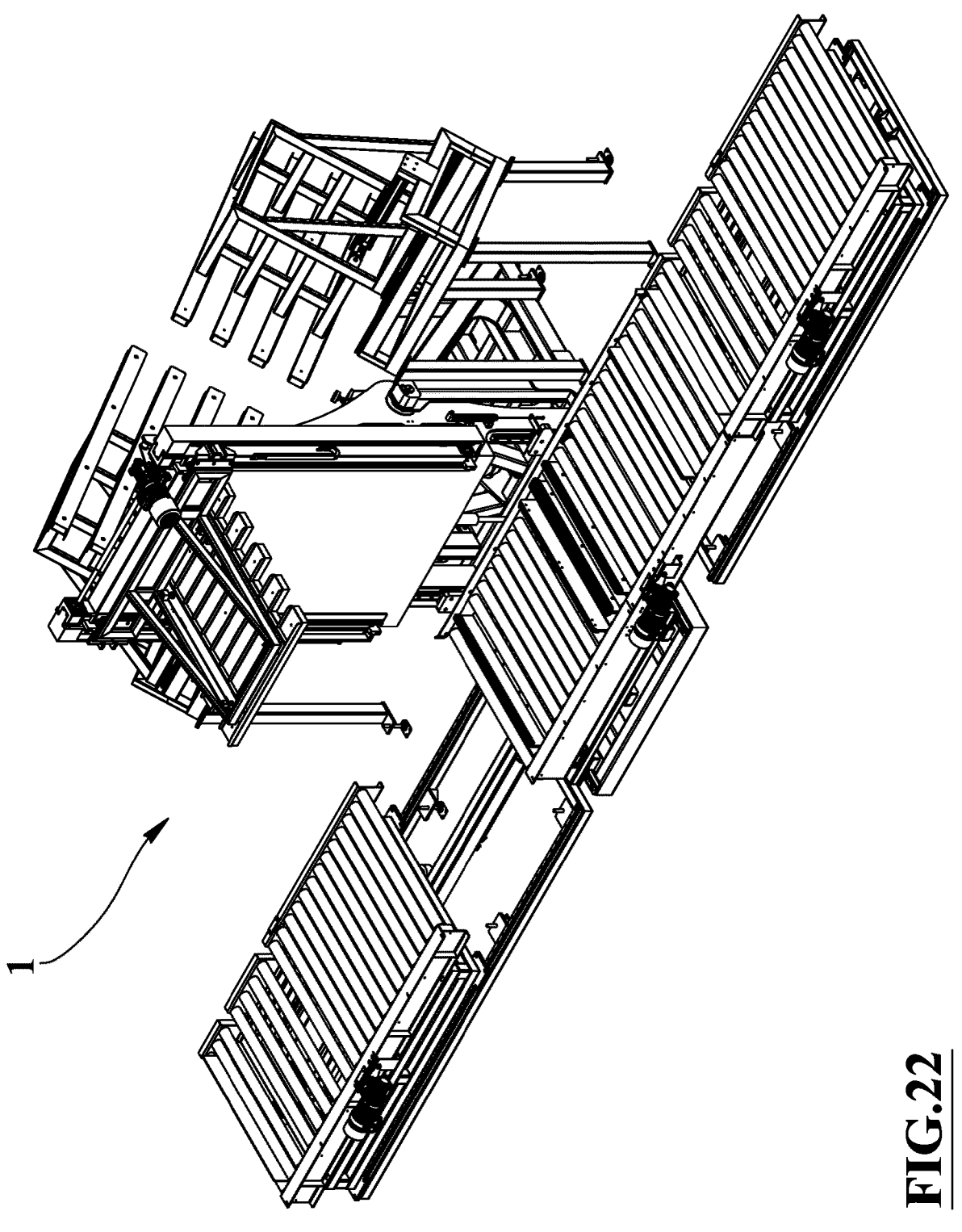
FIG. 22 illustrates the device of FIG. 20 equipped with inlet and outlet roller conveyors and a member for supplying and/or storing pallets.

As illustrated in FIG. 22, the device 1 can be equipped with pallet storage and/or with pallet magazine and or loader and with entrance and exit conveyor for the automatic or almost automatic operation of the device 1. Also one or more active or motorized element or parts of the device of FIGS. 20-22 are commanded by programmable control means.

The invention claimed is:

1. A device for replacing a pallet (P) supporting a bottom face of a load (C) with a second pallet(S), said device comprising:

a slide surface element (3) having a flat face for static and sliding abutment with a lateral face of the load (C);

a translating support element (5) defining an elongated flat surface or face for abutting with the first pallet (P) aligned side-by-side with the second pallet(S) and provided with pallet gripping elements (6) where the flat surface or face of the translating support element (5) is perpendicular to the flat face of the slide surface element (3);

a load sliding control element (7) having a face parallel to the translating support element (5) for meeting with a top face of the load (C) opposite the bottom face of the load;

a connecting element (9) that rigidly constrains the slide surface element (3) and that constrains the translating support element (5) to translate linearly on a geometric plane of the elongated flat surface along a direction of a longitudinal axis of the translating support element or to translate in a parallel direction to said flat face of the slide surface element (3), wherein the load sliding control element (7) is connected to the slide surface element (3), to the connecting element (9), or to both the slide surface element (3) and the connecting element (9);

a rotation member (11) connected to the connecting element (9) to allow rotation of the connecting element (9) around a rotation axis (R), parallel to at least the flat face of the translating support element (5), between an initial condition, wherein the slide surface element (3) and the translating support element (5) are respectively vertical and horizontal, and a pallet replacement condition in which the slide surface element (3) and the translating support element (5) are rotated by more than 90° and vice versa;

a base structure member (13), for fixing on a horizontal floor and connected to the connecting element (9) by means of the rotation member (11) in a way that the rotation axis (R) is horizontal and at a height with respect to the floor such as to allow that at least in an initial condition (O) the slide surface element (3) and the translating support element (5) are respectively vertical and horizontal and to allow free rotation of the connecting element (9), and of what is fixed or connected to it, at least up to a replacement condition of the pallet and vice versa;

wherein said device further comprises a rotation actuator (14) interposed between the base structure member (13) and the connecting element (9) for rotation of the connecting element (9); and wherein the translating support element (5) is directly or indirectly connected to the connecting element (9) by means of a set of slide guides (15) and at least one linear actuator (17) or linear damper (18) wherein said slide guides (15) and the actuator (17) or damper (18) are parallel to each other, to a longitudinal development of the translating support element (5) and to a translation direction of the translating support element (5) defined by the slide guides and the at least one linear actuator (17) or linear damper (18).

2. The device according to claim 1, wherein the flat face of the slide surface element (3) is parallel to the rotation axis (R) and that the translation direction of the translating support element (5) is parallel to the rotation axis (R) and to the flat face of the slide surface element (3), and the slide surface element (3) is adjacent to a longitudinal side of the translating support element (5).

3. The device according to claim 2, wherein the load sliding control element (7) consists of a flat body or that defines a surface for abutment with the load (C) and connected perpendicularly to the slide surface element (3) for translating toward and away from the translating support element (5) by means of actuation members comprising a set of guides and at least one linear actuator mutually parallel and perpendicular to the translating support element (5) and to the load sliding control element (7).

4. The device according to claim 1, wherein the flat face of the slide surface element (3) is parallel to the rotation axis (R) and that the translation direction of the translating support element (5) is perpendicular to the rotation axis (R) and to the flat face of the slide surface element (3), wherein the slide surface element (3) is adjacent to a transverse side of the translating support element (5).

5. The device according to claim 4, wherein the slide surface element (3) is spaced from the translating support element (5) and from the corresponding gripping element (6)

for the passage of the gripping element (6) and of the first pallet between the slide surface element (3) and the translating support element (5).

6. The device according to claim 4, wherein the load sliding control element (7) consists of a flat body, or defines a surface for abutment with the load (C), and connected to a portion of the connecting element (9) by means of a set of respective linear guides (21) and at least one linear actuator (23) parallel to each other and to the slide surface element (3) and perpendicular to the rotation axis (R) and to the translating support element (5) for translating the load sliding control element (7) toward and away from the translating support element (5).

7. The device according to claim 1, wherein the gripping elements (6) comprise a set of fins projecting transversely from the flat face of the translating support element (5) of the fixed type, or longitudinally translating by means of respective linear actuators (25), or both.

8. The device according to claim 1, further comprising control means of a programmable digital type and provided with input ports for signals and output ports for operating commands of controllable parts of the device according to a stored program.

9. The device according to claim 1, wherein the translating support element (5) comprises a roller conveyor defining the elongated flat surface or face for abutting or resting the pallets where the rollers of the conveyor are free rotating or motorized.

10. The device according to claim 9, wherein end portions of said translating support element (5) comprise respective gripping elements (6) provided with a respective linear actuators (25) to translate the gripping elements (6) in the direction of the longitudinal axis of the translating support element (5), wherein a median portion of the translating support element (5) comprises a plurality of gripping element (6); wherein the end and median gripping elements (6) are provided with respective hiding actuators, each assigned to translate perpendicularly to and from the elongated flat surface or face of the translating support element (5) the respective gripping element (6) actuated between a hidden condition and a protruding condition inward to or outward from the surface defined by the translating support element (5).

11. The device according to claim 10, further comprising a translating member (31) carrying at least the support element (5) and the gripping elements (6) and assigned to translate the support element (5) perpendicularly, transversely, or both perpendicularly and transversely to the elongated flat surface or face.

12. The device according to claim 11, wherein the translating member (31) comprises at least a shelf member (33) connected to the connecting element (9) by means of a set of first motorized guides (35) to move the translating support element (5) perpendicularly to the longitudinal axis of the translating support element (5).

13. The device according to claim 12, wherein the translating member (31) comprises a transversal support (37) connected to the shelf member (33) by means of a set of second motorized guides (39) to move the translating support element (5) transversally to the longitudinal axis of the translating support element.

14. The device according to claim 13, comprising pallet storage, a pallet magazine, a loader with a motorized entrance and exit conveyor for automatic operation of the device (1).

15. The device according to claim 14, wherein the translating support element (5) consists of a conveyor having motorized rollers and at least said conveyor, the gripping elements (6), the translating member (31), the pallet storage, the pallet magazine, the loader, the motorized entrance conveyor and exit conveyor are operated and controlled and by a programmable control means.

* * * * *